UNITED STATES PATENT OFFICE.

JESSE C. CHISHOLM, OF DALLAS, TEXAS.

PROCESS OF REFINING CRUDE COTTON-SEED OIL.

1,007,642.  Specification of Letters Patent.  Patented Oct. 31, 1911.

No Drawing.  Application filed February 27, 1911. Serial No. 610,978.

*To all whom it may concern:*

Be it known that I, JESSE C. CHISHOLM, a citizen of the United States, residing at Dallas, in the county of Dallas and State of Texas, have invented certain new and useful Improvements in Processes of Refining Crude Cotton-Seed Oil, of which the following is a specification.

This invention relates to processes of refining oil and more particularly to a process of refining crude cotton-seed oil.

The principal object of this invention is to increase the yield of refined oil.

A further object of this invention is to produce as a by-product cotton-seed "foots" or soap stock of a more coherent nature and containing less oil than that obtained in the practice of refining oil by the caustic soda method.

Other objects and advantages of this invention will appear in the course of the following specification.

In the practice of my process in its preferred form, crude cotton-seed oil is treated with an aqueous solution of a water-soluble alkaline silicate, preferably a water-soluble silicate of sodium, as sodium silicate ($Na_2SiO_3$), sodium disilicate ($Na_2Si_2O_5$), sodium trisilicate ($Na_2Si_3O_7$), sodium tetrasilicate ($Na_2Si_4O_9$), or any other silicate of sodium, silicated sodium silicate, or mixture or combination of such silicates of constant or varying composition containing sodium and the silicate radical. Of these however, I prefer to employ the sodium tetrasilicate.

In explanation of the term "silicated sodium silicate" it may be stated that in addition to the mono-, di-, tri-, and tetra silicates of sodium there are, as a practical matter, silicates of sodium which correspond in composition to none of the salts mentioned. There are sodium silicates of disputable composition which are readily silicated sodium silicates. For example, if you add one gram of silica to ten grams of the tri-silicate there is produced a sodium silicate which is not the mono-, di-, tri-, nor tetra silicate of sodium, but silicated sodium silicate of disputable composition. I have found that either of these silicates or mixtures or combination thereof may be successfully employed in the practice of my process and it is to be understood that such materials are embraced within the term "silicate of sodium" as herein employed. I have also found that in place of using the sodium salts above specified, that I may employ the corresponding potassium salts and obtain satisfactory commercial results.

The strength of the solution of the alkaline silicate and the proportion of such silicate to the crude oil under treatment may vary widely according to the character of such oil. I have found, however, that satisfactory results may be obtained by the addition of from one to three parts by weight of an alkaline silicate solution of from 15° to 20° Baumé to one hundred parts by weight of the crude oil.

After the silicate solution is added to the oil, the mixture is stirred or otherwise agitated at a temperature of from approximately 75° to 90° F., the agitation being continued and the temperature maintained until the oil "grains," from the separation of soap stock and the yellow color of the foam on the oil changes to a darker shade. This effect takes place when the fatty acids contained in the oil are neutralized by the action of the alkaline silicate which has been added thereto, the oil being rendered neutral or alkaline. There is then gradually added to the mixture from two to eight per cent. by weight of a solution of alkaline hydroxid, preferably sodium hydroxid of from 12° to 22° Baumé. This alkaline hydroxid solution is added until a filtered sample of the mixture shows an oil of the required color. Having obtained oil of the required color the addition of the alkaline hydroxid is continued and tests are made from time to time upon removed samples, by heating such samples to preferably from approximately 120° to 140° F., the alkaline hydroxid solution being added until such samples are found to reach the "critical point," that is to say, the point at which the soap stock precipitate in the sample will settle rapidly and completely from the oil and be practically free from contained oil. When this point is reached no further addition of the alkaline hydroxid is made. The oil is stirred or otherwise agitated while being treated with the alkaline hydroxid. The mass of treated oil is then heated to preferably from 100° to 120° F., the mixture being agitated during such heating. The heating and agitating are continued until the soap stock particles agglomerate and a test of a removed sample of the oil shows that the soap stock therein will settle rapidly and completely from the refined oil. The oil is then allowed to stand preferably from two to twenty-four hours until the soap stock has completely settled. The supernatant oil is then drawn off and heated to preferably about 150° F. to free the same from water. If desired, air may be pumped through the refined oil to accelerate the drying operation. The refined oil is then filtered.

I have found that improved results may be obtained in the practice of my process by subjecting the oil to a preliminary treatment, consisting in heating it to about 80° F. and subjecting it to agitation prior to the addition of the alkaline silicate thereto. When the oil is subjected to this preliminary treatment, the silicate solution is preferably added immediately after such treatment without allowing the oil to cool, the remainder of the process being carried out exactly as hereinabove set forth. When the preliminary treatment is omitted the crude oil may be heated either before or after the addition to the alkaline silicate solution. I have also found that the treatment with the alkaline silicate solution alone, particularly when the oil is heated, improves the character of such oil materially.

While in the practical operation of my process I prefer to heat the oil as indicated, some measure of success in the practice of the process may be obtained without subjecting the oil to artificial heat. In summer a considerable measure of success may be obtained throughout the Southern States without any application of artificial heat. At other seasons of the year and in other sections of this country, some measure of success may be obtained by prolonged treatment with the reagents set forth, without any application of heat whatever, but the practice of the process can be carried out most effectively under the conditions of temperature hereinbefore set forth.

While I have set forth in detail the strength of the solutions and the proportions of the various reagents which I prefer to employ, it is to be understood that my process is not restricted thereto, but that the strength of such solutions and the proportions may be widely varied, without departing from the spirit of my invention or the scope of the appended claims. This wide variation in the strength of solutions and the proportions of the reagents is necessitated by reason of the widely varying characters of the crude cotton-seed oils received for refining.

In a separate application for a process of refining crude cotton-seed oil filed concurrently herewith and bearing Serial No. 610,977, I have described and broadly claimed a process of overcoming the acidity of the oil by the use of a base which does not exert a saponifying action on the oil and subsequently treating the neutral or slightly alkaline mixture with an alkaline hydroxid and such process is not broadly claimed herein.

Having thus described my invention, I claim:—

1. The process of refining crude cotton-seed oil, which consists in subjecting it to the action of an alkaline silicate until the acidity of the oil is approximately overcome, then subjecting it to the action of an alkaline hydroxid, and separating the oil from the soap stock formed.

2. The process of refining crude cotton-seed oil, which consists in subjecting it to the action of heat and an alkaline silicate, the alkaline silicate being added until the acidity of the oil is approximately overcome, then subjecting it to the action of heat and an alkaline hydroxid, and separating the oil from the soap stock formed.

3. The herein described process of refining crude cotton-seed oil, which consists in heating and agitating the oil at a temperature of about 80° F., adding an aqueous solution of an alkaline silicate thereto until the acidity of the oil is overcome, maintaining the temperature of the mixture at from approximately 75° to 90° F. until the separation of soap stock is apparent in the oil, adding an aqueous solution of an alkaline hydroxid, maintaining the temperature of the oil until a test sample of the mixture shows the required color, adding additional alkaline hydroxid until in a test sample of the mixture removed and heated to approximately from 120° to 140° F., the soap stock precipitate separates rapidly and completely from the oil, then heating the mass of treated oil to preferably from 100° to 120° F., such heating being continued until the soap stock settles rapidly and completely from the oil, allowing the soap stock to settle, and separating the oil from the soap stock.

In testimony whereof I affix my signature in presence of two witnesses.

JESSE C. CHISHOLM.

Witnesses:
C. L. PARKER,
B. W. FISHBURNE.